United States Patent
Nammi et al.

(10) Patent No.: US 9,698,881 B2
(45) Date of Patent: Jul. 4, 2017

(54) FEEDBACK CHANNEL TRANSMISSION AND DETECTION IN MULTI ANTENNA WIRELESS COMMUNICATION SYSTEMS

(71) Applicant: Telefonaktiebolaget LM Ericsson (publ), Stockholm (SE)

(72) Inventors: Sairamesh Nammi, Kista (SE); Mattias Frenne, Uppsala (SE); Bo Göransson, Sollentuna (SE); Johan Bergman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/022,275

(22) PCT Filed: Nov. 12, 2015

(86) PCT No.: PCT/SE2015/051206
§ 371 (c)(1),
(2) Date: Mar. 16, 2016

(87) PCT Pub. No.: WO2016/076785
PCT Pub. Date: May 19, 2016

(65) Prior Publication Data
US 2016/0301455 A1 Oct. 13, 2016

Related U.S. Application Data

(60) Provisional application No. 62/079,623, filed on Nov. 14, 2014.

(51) Int. Cl.
*H04B 7/04* (2017.01)
*H04B 7/06* (2006.01)

(52) U.S. Cl.
CPC ......... *H04B 7/0469* (2013.01); *H04B 7/0478* (2013.01); *H04B 7/0626* (2013.01); *H04B 7/0639* (2013.01); *H04B 7/0645* (2013.01)

(58) Field of Classification Search
USPC ......... 375/267, 296, 220, 260; 370/329, 252
See application file for complete search history.

(56) References Cited

U.S. PATENT DOCUMENTS 9,088,322 B2 * 7/2015 Koivisto ............. H04B 7/0482
9,088,323 B2 * 7/2015 Park ..................... H04B 7/0486
(Continued)

FOREIGN PATENT DOCUMENTS

EP    2 592 763 A2    5/2013

OTHER PUBLICATIONS

3GPP, Draft—"Itri, et al., "Discussion on Periodic CSI Reporting for CoMP Operations" R1-123542," 3rd Generation Partnership Project—Mobile Competence Centre; vol., RAN WG1, no. Qingdao, China; Aug. 13, 2012-Aug. 17, 2012 Aug. 5, 2012, Retrieved from the Internet: URL:http://www.3gpp.org/ftp/tsg_ran/WG1_RL, Aug. 5, 2012.

*Primary Examiner* — Eva Puente
(74) *Attorney, Agent, or Firm* — Sage Patent Group

(57) ABSTRACT

A method by a network node in a communications system includes determining a codebook subset restriction indicating a reduced set of precoding matrices out of an original set of precoding matrices in an original codebook. The full set of Precoding Matrix Indicator, PMI, bits is used to identify the original set of precoding matrices in the original codebook. The method includes determining a reduced set of Precoding Matrix Indicator, PMI, bits for use in a feedback channel based on a number of entries in the reduced set of precoding matrices. The reduced set of PMI bits has fewer bits than the full set of PMI bits. Related user equipments, methods by user equipments and network nodes are disclosed.

40 Claims, 11 Drawing Sheets

Active Array Antenna Array

(56) References Cited

U.S. PATENT DOCUMENTS

| | | | |
|---|---|---|---|
| 2011/0116563 A1* | 5/2011 | Vitthaladevuni | H04L 1/0001 375/260 |
| 2011/0249713 A1* | 10/2011 | Hammarwall | H04B 7/0634 375/220 |
| 2012/0275314 A1* | 11/2012 | Prasad | H04B 7/0417 370/241 |
| 2013/0114763 A1* | 5/2013 | Park | H04B 7/0413 375/296 |
| 2014/0016549 A1 | 1/2014 | Novlan et al. | |
| 2015/0098346 A1* | 4/2015 | Guo | H04B 7/0478 370/252 |
| 2015/0207556 A1* | 7/2015 | Nammi | H04B 7/0413 370/329 |
| 2016/0127018 A1* | 5/2016 | Nammi | H04B 7/0417 375/267 |

* cited by examiner

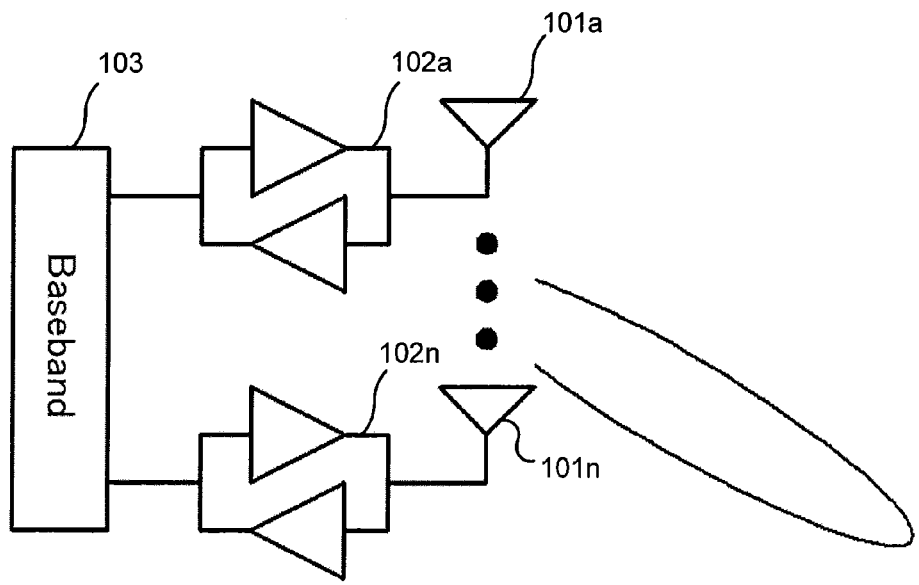
Figure 1 Active Array Antenna Array
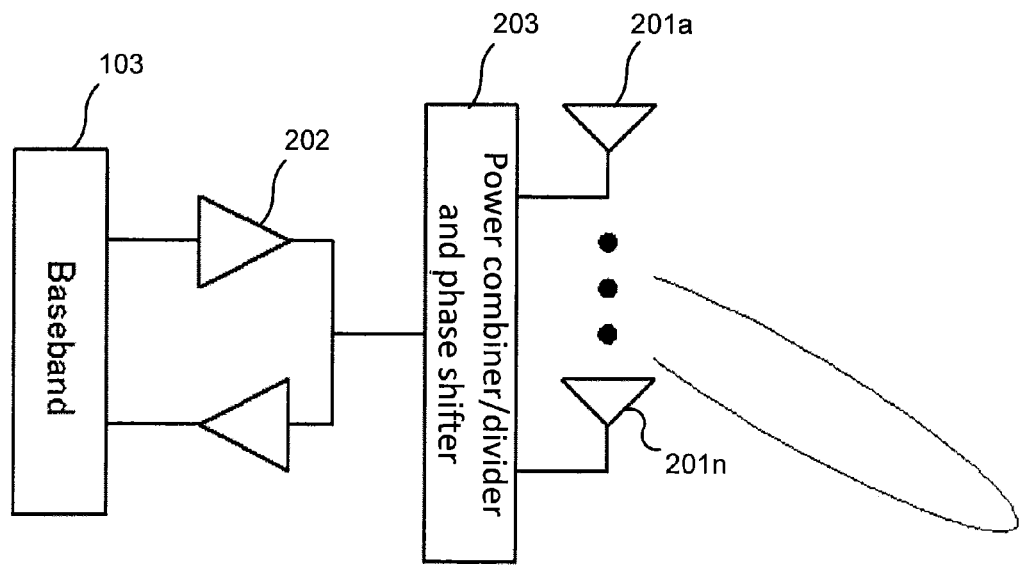
Figure 2 Passive Antenna Array

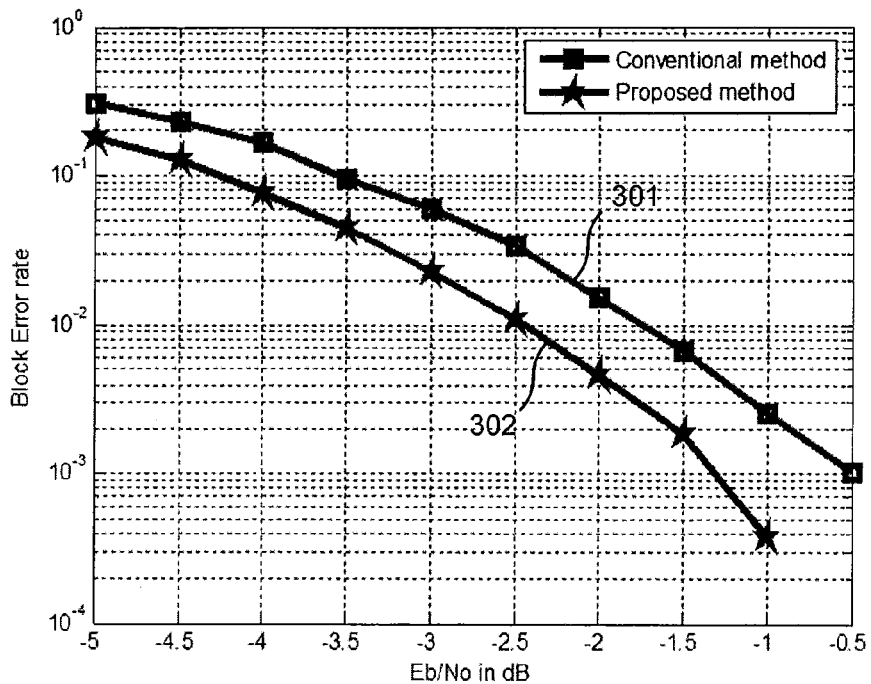
Figure 3 BLER with the proposed method
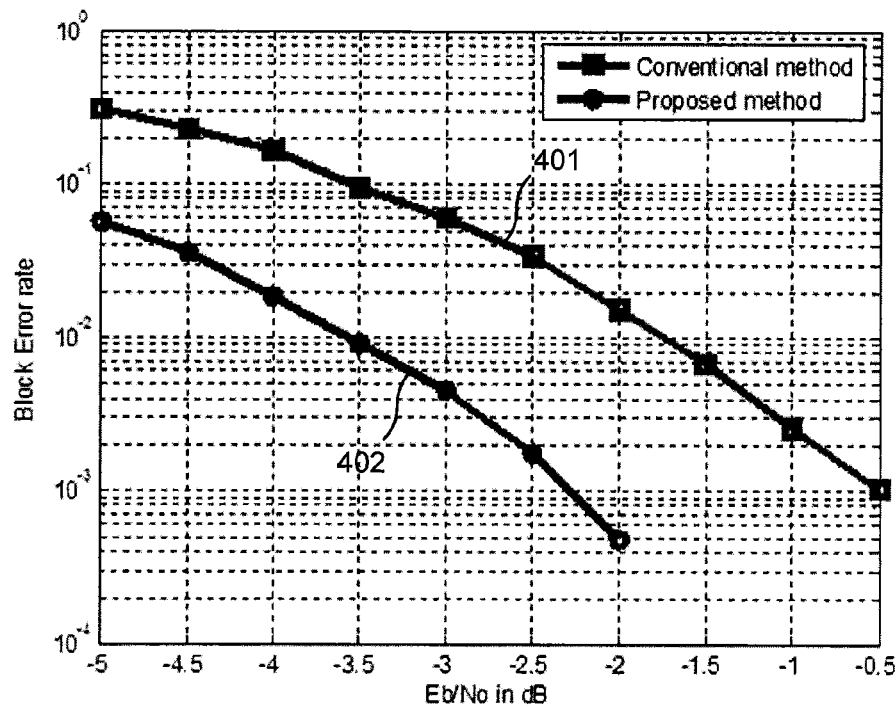
Figure 4 BLER with the proposed method

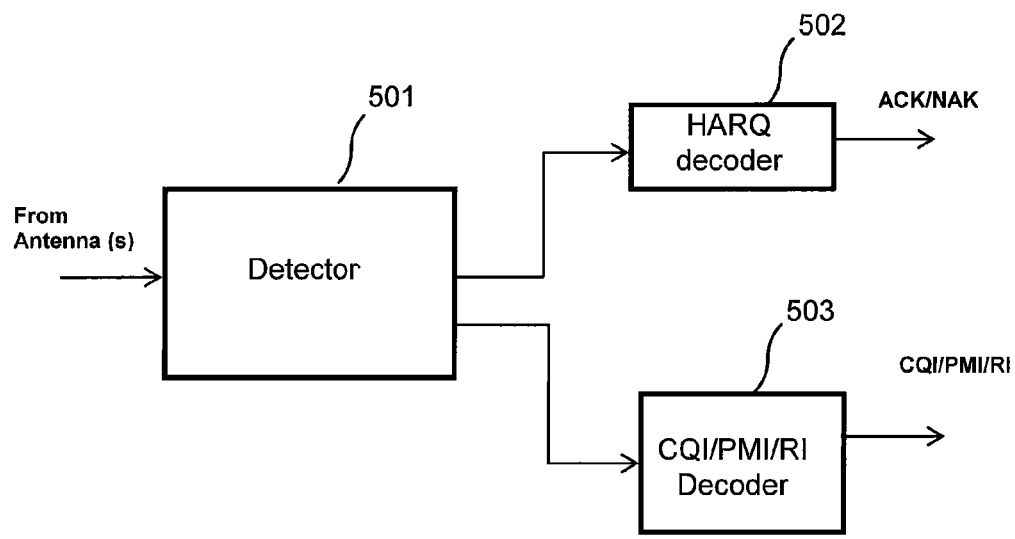
Figure 5 Receiver block diagram

Determining, based on a value of the reduced set of PMI bits and the mapping, a precoding matrix from the original set of precoding matrices — 901

FIGURE 9

Transmitting an instruction to a second user equipment to refrain from applying codebook subset restriction — 1001

Receiving on the feedback channel, from the second user equipment, a second feedback message comprising the full set of PMI bits — 1002

FIGURE 10

1301 — Receiving on the feedback channel, from the user equipment, the message comprising the reduced vertical set of PMI bits

FIGURE 13

1401 — Determining, based on a value of the reduced vertical set of PMI bits and the vertical mapping, a vertical precoding matrix from the original vertical set of precoding matrices

FIGURE 14

1501 — Applying the codebook subset restriction and/or the vertical codebook subset restriction to the feedback channel responsive to receiving the CSI report periodically 1502 — Refraining from applying the codebook subset restriction and the vertical codebook subset restriction responsive to receiving the CSI report aperiodically

FIGURE 15

FEEDBACK CHANNEL TRANSMISSION AND DETECTION IN MULTI ANTENNA WIRELESS COMMUNICATION SYSTEMS

CROSS REFERENCE TO RELATED APPLICATIONS

This application is a 35 U.S.C. §371 national stage application of PCT International Application No. PCT/SE2015/051206, filed on Nov. 12, 2015, which itself claims priority to U.S. provisional Application No. 62/079,623, filed Nov. 14, 2014, the disclosure and content of all of which are incorporated by reference herein in their entireties.

TECHNICAL FIELD

The present disclosure is related to wireless communication systems and in particular to wireless communication methods, networks, network nodes and user equipment for configuring and sending data through adaptive control channels.

BACKGROUND

Multiple input multiple output (MIMO) is an advanced antenna technique to improve the spectral efficiency and thereby boost the overall system capacity. MIMO techniques use a common notation (M×N) to represent MIMO configuration in terms number of transmit (M) and receive antennas (N). The common MIMO configurations used or currently standardized for various technologies are: (2×1), (1×2), (2×2), (4×2), (4×4), (8×2), (8×4) and (8×8). The configurations represented by (2×1) and (1×2) are special cases of MIMO that correspond to transmit diversity and receiver diversity respectively. Current LTE and HSPA standards (up to Rel.12) supports the use of a 1-dimensional array of co- or cross-polarized antenna ports. Under development in 3GPP is standard support for 2-dimensional antenna ports, where antenna ports are located in both vertical and horizontal dimensions.

Multiple antennas employed at the transmitter and receiver may significantly increase the system capacity. By transmitting independent symbol streams in the same frequency bandwidth, usually termed as spatial multiplexing (SM), a linear increase in data rates is achieved with the increased number of antennas. On the other hand, by using space-time codes at the transmitter, reliability of the detected symbols can be improved by exploiting transmit diversity. Both these schemes assume no channel knowledge at the transmitter. However, in practical wireless systems such as the 3rd generation partnership project (3GPP) long term evolution (LTE), HSDPA and WiMAX and systems, the channel knowledge can be made available at the transmitter via feedback from the receiver to the transmitter. A MIMO transmitter may utilize this channel information to improve system performance with the aid of precoding. In addition to beam forming gain, the use of precoding may avoid the problem of an ill-conditioned channel matrix.

In practice, complete channel state information (CSI) may be available for a communication system using the time division duplex (TDD) scheme by exploiting channel reciprocity. However, for a frequency division duplex (FDD) system, complete CSI is more difficult to obtain. In a FDD system, some CSI knowledge may be available at the transmitter via feedback from the receiver. These systems are called limited feedback systems. There are many implementations of limited feedback systems such as codebook based feedback and quantized channel feedback. 3GPP LTE, HSDPA and WiMax recommend codebook based feedback CSI for precoding. Examples of CSI are channel quality indicator (CQI), precoding index (PCI), precoding matrix indicator (PMI), and/or rank indicator (RI). One or a combination of different types of CSI may be used by the network node (e.g. NodeB in UTRAN or eNodeB in LTE) for one or more resource assignment related tasks such as scheduling data to UEs, rank adaptation of MIMO streams, precoder selection for MIMO streams, etc.

In codebook based precoding, a predefined codebook is defined both at the transmitter and the receiver. The entries of the codebook may be constructed using different methods such as, for example, Grassmannian, Lloyd's algorithm, DFT matrix, etc. The precoder matrix is often chosen to match the characteristics of the $N_R \times N_T$ MIMO channel matrix H, resulting in so-called channel dependent precoding. This is also commonly referred to as closed-loop precoding and essentially strives for focusing the transmit energy into a subspace which is strong in the sense of conveying much of the transmitted energy to the UE. Alternatively, it may be used to avoid transmitting energy in directions that would interfere with another UE. In addition, the precoder matrix may also be selected to strive for orthogonalizing the channel, meaning that after proper linear equalization at the UE, the inter-layer interference is reduced. At the receiver it may be common to find the SINR with different codebook entries and choose the rank and/or precoding index which gives highest spectral efficiency (capacity).

However, the network may choose to utilize only a small number of precoding elements for a variety of reasons and indicate these to the UE. This selection may be referred to as codebook subset restriction or precoding weight restriction. One such reason could be that some transmit directions should be avoided since there is a low power eNB (known as a small cell) placed in that direction, and which may be interfered if the eNB transmits towards that direction. With codebook subset restriction the UE may be restricted to only select and report precoders that will be used by the network.

Overview of Codebook Subset Restriction

According to 3GPP standard TS 36.213, a UE is restricted to report PMI and RI within a precoder codebook subset specified by a bitmap parameter codebookSubsetRestriction configured by higher layer signaling. For a specific precoder codebook and an associated transmission mode, the bitmap may specify all possible precoder codebook subsets from which the UE can assume that the eNB may be using when the UE is configured in the relevant transmission mode. Codebook subset restriction is supported for open-loop spatial multiplexing, closed-loop spatial multiplexing, multi-user MIMO and closed-loop Rank=1 precoding. The resulting number of bits for each transmission mode is given in Table 1. The bitmap forms the bit sequence $a_{A_c-1}, \ldots, a_3, a_2, a_1, a_0$, where $a_0$ is the LSB and $a_{A_c-1}$ is the MSB and where a bit value of zero indicates that the PMI and RI reporting is not allowed to correspond to precoder(s) associated with the bit. The associations of bits to precoders for the relevant transmission modes are given as follows:

TABLE 1

Number of bits in codebook subset restriction bitmap for applicable transmission modes.

| | | Number of bits $A_c$ | |
|---|---|---|---|
| | | 2 antenna ports | 4 antenna ports |
| Transmission mode | Open-loop spatial multiplexing | 2 | 4 |
| | Closed-loop spatial multiplexing | 6 | 64 |
| | Multi-user MIMO | 4 | 16 |
| | Closed-loop rank = 1 precoding | 4 | 16 |

In HSPA:

According to 3GPP standard TS 25.214, a UE is restricted to report precoding control index (PCI), and number of transport blocks preferred (NTBP) within a precoder codebook subset specified by a bitmap parameter PrecodingWeightRestriction configured by higher layer signaling. The bitmap can specify all possible precoder codebook subsets from which the UE can assume the NodeB may be using when the UE is configured in MIMO mode with four transmit antennas. The bitmap forms the bit sequence $a_{63}, \ldots, a_3, a_2, a_1, a_0$ where $a_0$ is the LSB and $a_{63}$ is the MSB and where a bit value of zero indicates that the precoding indices reporting is not allowed in the NTBP/PCI/CQI report.

Active Array Antenna Systems:

Referring to FIG. 1, an active antenna array is illustrated. Active-array-antenna systems (AAS), where RF components, such as power amplifiers 102a . . . n and transceivers are integrated with an array of antennas elements 101a . . . n to boost baseband signals 103, as shown in FIG. 1, offer several benefits compared to traditional deployments with passive antennas connected to transceivers through feeder cables.

FIG. 2 illustrates a passive antenna array. FIG. 2 shows an example of passive antennas array system where the baseband signals 103 are boosted by power amplifier 202 and connected to the antennas 201a . . . n by longer feeder cables. By using active antenna array as in FIG. 1, not only are cable losses reduced, leading to improved performance and reduced energy consumption, but also installation may be simplified and the required equipment space may be reduced.

There are many applications of active antennas for example cell specific beamforming, user specific beamforming, vertical sectorization, massive MIMO, elevation beamforming etc. It may also be an enabler for further-advanced antenna concepts such as deploying large number of MIMO antenna elements at the eNodeB. For these reasons, 3GPP started a study item investigating the feasibility to increase the number of transmit antennas to 16/32/64 for various purposes and also extending the CSI feedback to support 2-dimensional antenna arrays where the up to 64 eNodeB antenna ports are distributed both in vertical and horizontal directions.

Coverage Enhancements in LTE

Work is ongoing in 3GPP to enhance the coverage for machine type communication (MTC) devices, a special category of UEs, and to achieve in the order of 15-20 dB coverage enhancements in LTE multiple physical channels and physical signals will need to be improved. Since the required improvements are large (20 dB coverage improvements may be equivalent to operation at 100 times lower signal-to-noise ratio) and LTE is already very good, (i.e. there is no known flaw in LTE that can provide improvements anywhere near 100 times) it is likely that plain old repetition will provide most of the required coverage improvements. Current LTE signals may not easily be repeated approximately 100 times, for example, due to timing constraints during connection setup and other procedures. Therefore, new signals may need to be defined for this purpose.

A likely outcome of the 3GPP work on enhanced coverage MTC devices is therefore support of single layer transmission, since multiple layer MIMO transmission is not applicable for UEs with extreme coverage extension due to poor SINR.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

One embodiment of the present inventive concepts is directed to a method by a network node in a communications system. The method includes determining a codebook subset restriction indicating a reduced set of precoding matrices out of an original set of precoding matrices in an original codebook. The full set of Precoding Matrix Indicator, PMI, bits is used to identify the original set of precoding matrices in the original codebook, determines a reduced set of PMI bits for use in a feedback channel based on a number of entries in the reduced set of precoding matrices. The reduced set of PMI bits has fewer bits than the full set of PMI bits.

A potential advantage of this and other embodiments is that the overhead in the feedback channel may scale based on the codebook subset restriction, thereby transmitting compact control channel information. This results in increased energy efficiency at the transmitter and/or at the receiver due to the adaptive feedback overhead. Throughput thus is improved for the downlink and/or the uplink due to the additional available energy for traffic channels. Additionally, uplink interference is reduced, leading to overall system level benefits.

According to further embodiments, the method includes transmitting the codebook subset restriction indicating the reduced set of precoding matrices to a user equipment and/or determining a mapping of the entries in the reduced set of precoding matrices to entries in the original set of precoding matrices. In some embodiments, the method includes receiving on the feedback channel at the network node, from the user equipment, a feedback message having a length defined by the reduced set of PMI bits. The method includes decoding signals from the feedback channel using the reduced set of PMI bits and/or determining, based on a value of the reduced set of PMI bits and the mapping, a precoding matrix from the original set of precoding matrices.

According to further embodiments, the method includes transmitting an instruction to another user equipment to refrain from applying codebook subset restriction, and/or receiving on the feedback channel, from the another user equipment, another feedback message including the full set of PMI bits, responsive to the instruction. The original set of precoding matrices is represented by the full set of PMI bits. A number of bits in the reduced set of PMI bits is less than a number of bits in the full set of PMI bits. The feedback channel includes an uplink control channel and/or a downlink control channel. The codebook subset restriction is determined based on receiving a channel state information, CSI, report received from the user equipment.

According to further embodiments, the original set of precoding matrices is associated with a horizontal array of antennas. The method includes determining a vertical codebook subset restriction indicating a reduced vertical set of precoding matrices out of an original vertical set of precoding matrices in an original vertical codebook associated with a vertical array of antennas, and/or determining a reduced vertical set of Precoding Matrix Indicator, PMI, bits for use in the feedback channel based on a set of vertical entries in the reduced vertical set of precoding matrices. The vertical codebook subset restriction is transmitted to the user equipment. Some embodiments include generating a vertical mapping of the entries in the reduced vertical set of precoding matrices to entries in the original vertical set of precoding matrices. A message including the reduced vertical set of PMI bits is received on the feedback channel, from the user equipment. A vertical precoding matrix from the original vertical set of precoding matrices is determined based on a value of the reduced vertical set of PMI bits and the vertical mapping. The original set of precoding matrices is the same as the original vertical set of precoding matrices.

According to further embodiments, determining the codebook subset restriction is based on receiving a channel state information, CSI, report from the user equipment. The method includes applying the codebook subset restriction and/or the vertical codebook subset restriction to decode the feedback channel responsive to receiving the CSI report periodically. The network node refrains from applying the codebook subset restriction and the vertical codebook subset restriction responsive to receiving the CSI report aperiodically. Each precoding matrix of the original set of precoding matrices in the original codebook is identified by a respective pattern of the full set of PMI bits. Each precoding matrix in the reduced set of precoding matrices is identified by a respective pattern of the reduced set of PMI bits. A network node in a telecommunication system may be adapted to perform some, any, or all of the steps described above.

Another embodiment of the present inventive concepts is directed to a method by a user equipment in a communications system. The method includes determining a codebook subset restriction indicating a reduced set of precoding matrices out of an original set of precoding matrices in an original codebook. A full set of Precoding Matrix Indicator, PMI, bits is used to identify the original set of precoding matrices in the original codebook. The method includes determining a reduced set of Precoding Matrix Indicator, PMI, bits based on a set of entries in the reduced set of precoding matrices. The reduced set of PMI bits has fewer bits than the full set of PMI bits.

According to further embodiments, determining the codebook subset restriction includes receiving the codebook subset restriction from a network node. The method includes generating a mapping rule based on the codebook subset restriction. Generating the codebook subset restriction includes receiving the codebook subset restriction from a network node. Generating the codebook subset restriction includes determining, by the user equipment, the codebook subset restriction indicating a reduced set of precoding matrices based on a reported user equipment category. Generating the codebook subset restriction includes determining, by the user equipment, the codebook subset restriction indicating a reduced set of precoding matrices based on a physical channel type used to transmit uplink control information.

According to further embodiments, the method includes transmitting, on a feedback channel, a feedback message having the reduced set of PMI bits. The reduced set of PMI bits includes an indication of one of the reduced set of precoding matrices based on the mapping rule. In some embodiments, the method includes receiving, from the network node, an instruction to refrain from applying the codebook subset restriction, and/or transmitting, on the feedback channel, another feedback message comprising the full set of PMI bits, responsive to the instruction.

According to further embodiments, the original set of precoding matrices is associated with a horizontal array of antennas. The method includes receiving a vertical codebook subset restriction indicating a reduced vertical set of precoding matrices out of an original vertical set of precoding matrices in an original vertical codebook associated with a vertical array of antennas. A vertical mapping rule is generated based on the vertical codebook subset restriction. A reduced vertical set of PMI bits is generated based on a set of entries in the reduced vertical set of precoding matrices. The method includes transmitting on the feedback channel, the feedback message comprising the reduced vertical set of PMI bits. The reduced vertical set of PMI bits includes an indication of one of the reduced vertical set of precoding matrices based on the vertical mapping rule.

According to further embodiments, the method includes receiving a request from the network node to send a channel state information, CSI, report periodically or aperiodically. The codebook subset restriction and/or the vertical codebook subset restriction is applied to the feedback message on the feedback channel, responsive to determining that the CSI report be sent periodically. Some embodiments includes refraining from applying the codebook subset restriction and the vertical codebook subset restriction to the feedback message on the feedback channel, responsive to determining that the CSI report be sent aperiodically. The feedback channel includes an uplink control channel and/or a downlink control channel. The user equipment is configured to decode spatial layers based on a rank of 1. Each precoding matrix of the original set of precoding matrices in the original codebook is identified by a respective pattern of the full set of PMI bits. Each precoding matrix in the reduced set of precoding matrices is identified by a respective pattern of the reduced set of PMI bits. A user equipment in a telecommunication system is adapted to perform some, any, or all of the operations according to the steps that have been discussed above.

Another embodiment of the present inventive concepts is directed to a network node. The network node includes a transceiver configured to provide communication between the network node and a user equipment and a processor coupled with the transceiver. The processor is configured to perform operations including determining a codebook subset restriction indicating a reduced set of precoding matrices out of an original set of precoding matrices in an original codebook. A full set of Precoding Matrix Indicator, PMI, bits is used to identify the original set of precoding matrices in the original codebook, and/or determining a reduced set of Precoding Matrix Indicator, PMI, bits for use in a feedback channel based on a number of entries in the reduced set of precoding matrices. The reduced set of PMI bits has fewer bits than the full set of PMI bits.

According to further embodiments, the processor of the network node further performs operations including determining a mapping of the entries in the reduced set of precoding matrices to entries in the original set of precoding matrices, and/or receiving on the feedback channel, from the user equipment, a feedback message having the reduced set of PMI bits. The original set of precoding matrices is associated with a horizontal array of antennas. The processor of the network node further performs operations including determining a vertical codebook subset restriction indicating a reduced vertical set of precoding matrices out of an original vertical set of precoding matrices in an original vertical codebook associated with a vertical array of antennas, determining a reduced vertical set of Precoding Matrix Indicator, PMI, bits for use in the feedback channel based on a set of vertical entries in the reduced vertical set of precoding matrices, generating a vertical mapping of the entries in the reduced vertical set of precoding matrices to entries in the original vertical set of precoding matrices and/or determining, based on a value of the reduced vertical set of PMI bits and the vertical mapping, a vertical precoding matrix from the original vertical set of precoding matrices. Determining the codebook subset restriction is based on receiving a channel state information, CSI, report from the user equipment. The operations performed by the processor further include applying the codebook subset restriction and/or the vertical codebook subset restriction to the feedback channel responsive to receiving the CSI report periodically, and/or refraining from applying the codebook subset restriction and the vertical codebook subset restriction responsive to receiving the CSI report aperiodically.

Another embodiment of the present inventive concepts is directed to a user equipment. The user equipment includes a transceiver configured to provide communication between user equipment and a network node, and a processor coupled with the transceiver. The processor is configured to perform operations including determining a codebook subset restriction indicating a reduced set of precoding matrices out of an original set of precoding matrices in an original codebook. A full set of Precoding Matrix Indicator, PMI, bits is used to identify the original set of precoding matrices in the original codebook. Operations includes determining a reduced set of Precoding Matrix Indicator, PMI, bits based on a set of entries in the reduced set of precoding matrices. The reduced set of PMI bits has fewer bits than the full set of PMI bits.

According to further embodiments, the processor performs operations including transmitting, on a feedback channel, a feedback message comprising the reduced set of PMI bits. The reduced set of PMI bits includes an indication of one of the reduced set of precoding matrices based on the mapping rule.

According to further embodiments, the processor performs operations including receiving, from the network node, an instruction to refrain from applying the codebook subset restriction, and/or transmitting, on the feedback channel, another feedback message having the full set of PMI bits, responsive to the instruction. The original set of precoding matrices is associated with a horizontal array of antennas. The operations performed by the processor includes receiving a vertical codebook subset restriction indicating a reduced vertical set of precoding matrices out of an original vertical set of precoding matrices in an original vertical codebook associated with a vertical array of antennas, generating a vertical mapping rule based on the vertical codebook subset restriction, and/or determining a reduced vertical set of PMI bits based on a set of entries in the reduced vertical set of precoding matrices.

According to further embodiments, the processor performs operations including receiving a request from the network node to send a channel state information, CSI, report periodically or aperiodically, applying the codebook subset restriction and/or the vertical codebook subset restriction to a message on the feedback channel, responsive to determining that the CSI report be sent periodically, and/or refraining from applying the codebook subset restriction and the vertical codebook subset restriction to the message on the feedback channel, responsive to determining that the CSI report be sent aperiodically.

Other methods, UEs, and network nodes according to embodiments of the invention will be apparent to one with skill in the art upon review of the following drawings and detailed description. It is intended that all such additional methods, UEs, and network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 1 illustrates an active antenna array.

FIG. 2 illustrates a passive antenna array.

FIG. 3 illustrates comparisons of block error rates in an uplink control channel when the number of PMI bits is reduced by 1 bit.

FIG. 4 illustrates a comparison of block error rates for the case when the total number of codebook entries are represented by 1 bit.

FIG. 5 illustrates a receiver block diagram.

FIGS. 6 to 15 are flowcharts of operations and methods by a network node configured according to some embodiments.

DETAILED DESCRIPTION

Figure 6:
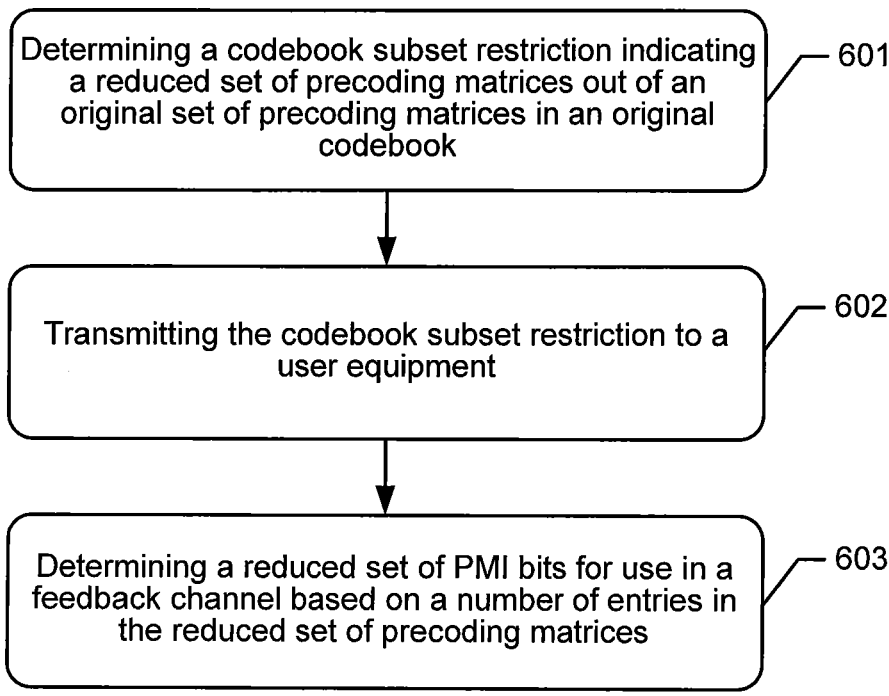

Embodiments will now be described more fully hereinafter with reference to the accompanying drawings. Embodiments may, however, be embodied in many different forms and should not be construed as limited to the embodiments set forth herein. Rather, these embodiments are provided so that this disclosure will be thorough and complete, and will fully convey the scope of present embodiments to those skilled in the art. It should also be noted that these embodiments are not mutually exclusive. Components from one embodiment may be tacitly assumed to be present/used in another embodiment.

Various embodiments are described herein for LTE. However these and other embodiments are applicable to any RAT or multi-RAT systems, where the UE receives and/or transmit signals (e.g. data), including, but not limited to, LTE FDD/TDD, WCDMA/HSPA, GSM/GERAN, Wi Fi, WLAN, CDMA2000, etc.

Although various embodiments are disclosed herein in the context of being performed by a UE and/or a network node, they are not limited thereto and instead can be performed in any type of electronic communication device or system.

In the current wireless systems, the standard defines different formats of the downlink and uplink feedback channels depending on the transmission mode. For example in HSDPA, the uplink feedback channel structure (HS-DPCCH) is different when the UE is configured in non-MIMO mode, in MIMO mode or in MIMO mode with four transmit antennas. Similarly for the downlink control channel (HS-SCCH) it defines Type 1, Type 3 and Type 4 downlink control channels respectively.

Similarly in LTE/LTE-A, different PUCCH/PUSCH structures are defined for uplink control channels and PDCCH for downlink control channels based on the transmission mode and the requirements of sub band or wideband reporting modes. However, when the UE is configured in a transmission mode through higher order signaling or Radio Resource Control (RRC) signaling the uplink and downlink feedback channel formats may remain the same at least as long as the UE is configured in that transmission mode.

Using codebook subset restriction, through RRC signaling or higher order signaling, the NodeB or eNodeB can send a bitmap dynamically by indicating only a subset of codebook elements. The UE may only consider these precoder(s) and rank(s) when computing the CSI. However the feedback channel design assumes that both the nodes use all the codebook elements. Hence the feedback channel design may not take into account the subset restriction and thus may not be optimal as the energy spent on each bit is wasted when the network signals only sets a subset of precoding elements to consider for CQI reporting.

Moreover, codebook subset restriction is only defined for 1-D MIMO codebooks and it is not clear how to extend this to 2-D MIMO codebooks as being considered in an ongoing LTE Rel-13 study item.

Various embodiments described herein may arise from a recognition for a need to reduce the set of Precoding Matrix Indicator (PMI) bits used to identify the set of precoding matrices used in the subset restriction. Techniques for enabling the UE to adaptively transmit the feedback channel by taking into consideration the codebook precoder vector/matrix subset restriction. In other words, the feedback channel (uplink and/or downlink) scales according to the codebook subset restriction bit pattern signaled by the network to the UE. The embodiments may be applicable both to 1D and 2D precoding codebooks. This signaling may be UE specific. In other words, each UE may have a different codebook subset restriction bitmap.

As described herein, some embodiments may provide several advantages. For example, Feedback channel structure and payload, i.e. overhead may scale based on the precoding subset restriction, thereby transmitting compact control channel information.

Energy efficiency may increase at the transmitter and/or at the receiver due to the adaptive feedback overhead.

Standardization efforts may be minimal as the nodes can reuse the existing feedback channels defined for various transmission modes.

Throughput may be improved for both downlink and/or uplink due to the additional energy for traffic channels.

Particularly, uplink interference may be reduced which leads to system level benefits.

Improvement in coverage may be accomplished.

In some embodiments, the non-limiting term radio network node or network node is used and it refers to any type of network node serving a UE and/or connected to other network nodes or network elements or any radio nodes from where UEs may receive signals. Examples of radio network nodes are NodeB, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS) etc. system.

In some embodiments the non-limiting term user equipment (UE) is used and it refers to any type of wireless node and/or wireless device communicating with a radio network node in a cellular or mobile communication system. Examples of UEs are a target device, device to device (D2D) UE, machine type UE or UE capable of machine to machine (M2M) communication, PDA, iPad, tablet, mobile terminal, smart phone, laptop embedded equipped (LEE), laptop mounted equipment (LME), USB dongles, etc. Note that only 4×4 and 2×2 MIMO systems are discussed as nonlimiting examples in this disclosure, but it is equally applicable for any $N_t$ TX systems and for 1D codebooks as well as the new 2D codebooks under consideration in 3GPP.

The embodiments are described in the nonlimiting context of MIMO operation for E-UTRA/LTE/LTE-A, UTRA/HSPA FDD systems. The embodiments may be, however, applicable to any RAT or multi-RAT system where the UE operates using MIMO e.g. LTE TDD, GSM/GERAN, Wi-Fi, WLAN, WiMax, CDMA2000, LTE-NX, Massive MIMO systems etc.

The embodiments may be applicable to single carrier as well as to multicarrier (MC) or carrier aggregation (CA) operation of the UE in conjunction with MIMO in which the UE is able to receive and/or transmit data to more than one serving cell using MIMO. The term carrier aggregation (CA) may also called (e.g. interchangeably called) "multi-carrier system", "multi-cell operation", "multi-carrier operation", "multi-carrier" transmission and/or reception.

Please note that in this disclosure, the terms precoding weight restriction and codebook subset restriction are used interchangeably. Herein, embodiments are discussed in the context of wireless transmissions in the downlink as a nonlimiting example, embodiments described herein may be equally applicable in the uplink.

The embodiments described herein may include any combination of the following aspects and multiple embodiments:

General description of the idea

Methods at the receiving node for transmitting control information with precoding subset restriction Methods at the transmitting node for receiving control information when codebook subset restriction is applied The above embodiments are described in the following sections:

According to some embodiments, the network or network node (NodeB or eNodeB or RNC) may configure the UE with a set of transmission formats for the uplink and downlink feedback channel by considering different precoding weight restrictions. Synonyms to precoding weights are precoding vector, precoding matrix, beamforming weight, beamforming vector or beamforming matrix. Hence, the UE may transmit the specific uplink feedback channel based on the set of precoding subset restriction. Similarly, the NodeB or eNodeB may send the downlink control channel format based on the precoding subset restriction.

A system with $N_t$ transmit antennas may be considered. The precoding codebook sizes for each rank may be defined as $C_1, C_2, \ldots, C_8$. It may be assumed that up to rank=8 may be possible. However, the embodiments described herein may be equally applicable when the rank is more than 8. The number of bits needed to represent the PMIs may be $F(\log_2 (C_1))$, $F(\log_2 (C_2))$, $\ldots, F(\log_2(C_8))$. The function $F(x)$ may represent the ceil operation to the nearest integer. For example, $\log_2(9)$ is mapped to 4 bits.

If the eNodeB uses codebooks of size $D_1, D_2 \ldots, D_8$, for the eight different ranks respectively, where $D_1 <= C_1$, $D_2 <= C_2, \ldots, D_8 <= C_8$ (i.e after it sent the precoding weight restriction bitmap, e.g. using RRC signaling). The number of bits needed for each rank may be equal to $F(\log_2 (D_1))$, $F(\log_2 (D_2))$, $F(\log_2(D_8))$. In some embodiments, $F(\log_2 (D_1)) <= F(\log_2 (C_1))$, $F(\log_2 (D_2)) <= F(\log_2 F(C_2))$, $\ldots$, $F(\log_2(D_8)) <= F(\log_2 (D_8))$.

The UE may thus, in some embodiments, use a smaller number of bits to represent the precoding matrix index to transmit in a feedback channel compared to when the codebook is not restricted. For example, CQI may be represented by 4+3=7 bits and the PMI may be represented by 6 bits for rank r. The network may send a bitmap such that total number of elements in the codebook can be represented with 5 bits. Hence, in a conventional method, the UE may use a (20, 14) block code to transmit the feedback to the network, while in the proposed method, the UE may use (20, 13) block code to transmit the corresponding feedback information.

Referring now to FIG. 3, comparisons of block error rates in an uplink control channel for two-codeword MIMO, when the number of PMI bits is reduced by 1 bit, is illustrated. FIG. 3 illustrates an example of energy savings in the uplink control channel comparing a conventional use of bits energy curve 301 and a reduced number of PMI bits by 1 bit in curve 302. It can be seen that the energy saving at a block error rate (BLER) of 0.01 is around 1 dB leading to a more robust CSI feedback and/or a reduced transmit power at the UE. The UE power control formula may thus depend on the actual transmitted bits in the uplink feedback transmission. This energy savings in turn may lead to lower interference in the system and an increased system capacity.

Referring now to FIG. 4, a comparison of block error rates for the case when the total number of codebook entries are represented by 1 bit for single-codeword MIMO is illustrated. An increased and/or maximum gain may occur when the network uses a bitmap such that the total numbers of codebook entries are represented by 1 bit. FIG. 4 shows the energy savings in this case. Curve 401 illustrates an energy curve for conventional use of bits whereas curve 402 illustrates using one bit for the PMI. It can be seen by the difference in curves 401 and 402 that the energy savings by reducing by 3 bits in this example may be around 2 dB.

Methods at a Node and/or at a UE for Using Control Information with Precoding Subset Restriction:

When the network or network node sends the precoding subset restriction bitmap, the UE may need to re-map the codebook elements. This concept may be explained by a nonlimiting example. For example, the network may send a bitmap for rank r with the bitmap including 16 elements, as shown below.

| | Codebook index | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| bit setting | 1 | 0 | 0 | 0 | 1 | 0 | 0 | 0 | 1 | 0 | 0 | 1 | 0 | 0 | 0 | 0 |

When a bit setting is equal to 1, the UE may use the precoding vector or precoding matrix, or PMI, corresponding to this index. It can be seen that the UE needs to report one PMI from this subset of 4 PMIs. Hence the UE may need to remap the indices as shown below.

| | Code book index | | | |
|---|---|---|---|---|
| | 1 | 2 | 3 | 4 |
| PMI corresponding to the original codebook | 1 | 5 | 9 | 12 |

The UE may need to map the codebook indices once it receives the codebook subset restriction bitmap. Note that the remapping based on the codebook subset restriction for that UE is the same in the network and in the UE so that the network also understands this mapping such that if the UE reports codebook index 2, then it is actually referring to precoding matrix index 5 in the original codebook based on the mapping rule and the codebook subset restriction.

Once the UE maps the codebook elements, it uses the feedback channel corresponding to the new codebook. i.e. only 2 bits are needed in this example. Hence the UE uses a predefined feedback channel structure with 2 bits of PMI. Note that the standard defined several feedback channel structures with different payload sizes. Hence, these feedback channel structures may be reused.

As described herein, methods for creating a mapping rule or mapping table that give the original codebook and the restricted codebook, provide a one-to-one mapping of the signaled index and the precoding matrix/vector in the original (unrestricted) codebook.

As discussed herein, examples of various embodiments may be provided as follows:

Example 1: The UE maps the codebook elements based on precoding weight restriction bitmap.

Example 2: The receiving nodes transmit the control channels based on the bitmap Example 3: The receiving nodes reuse the control channels already defined based on the bitmap.

Example 4: A method performed at the transmitting node to receive the control information from the receiver node, the method comprises of choosing only a subset of codewords.

Method at Transmitting Node Such as an eNodeB and/or NodeB for Receiving Control Information when Codebook Subset Restriction is Applied Referring now to FIG. 5, a receiver for decoding the uplink control channel is illustrated. The received signal is passed through a detector 501 which, for example, may be a MMSE detector, a RAKE or generalized RAKE (GRAKE) which equalizes the multipath introduced by the channel, followed by a descrambler/de-spreader/demodulator. In some embodiments, the order is different and some components may not be required. The resultant signal may be passed through individual decoders of HARQ-ACK 502 and CQI/PMI/RI 503. As described herein, more details may be provided for the CQI/PMI/RI decoder 503 since codebook subset restriction is related to this decoder. At a network node such as an eNodeB, an uplink receiver may be of less complexity since a lesser number of codewords are processed. As a non-limiting example, the decoder may include a maximum likelihood (ML) decoder, but other types of decoders are possible.

If r is the detected vector of symbols of length N (codeword length) at the input of the CQI/PMI/RI then $$r = Ax + n$$

where A is an amplification/gain factor, x is the transmitted codeword decision decoder, n is the noise vector with variance of $\sigma^2$.

Assuming the noise is white Gaussian, then applying a maximum likelihood decoder which reduces and/or minimizes the probability of sequence error:

$$Ps = P(x \neq \hat{x})$$

where $\hat{x}$ is the estimate of x.

Reducing and/or Minimizing $P_s$ may be equivalent to increasing and/or maximizing the probability of correctly estimating x, i.e., $$Ps = \mathrm{arg\,max}_{\hat{x}} P(x \neq \hat{x} \mid r, A)$$

Applying Baye's theorem, and assuming bits within a codeword are independent, then the maximum likelihood criteria simplifies to $$Ps = \mathrm{arg\,max}_{\hat{x}} \left( \frac{1}{\sqrt{2\pi\sigma^2}} \right)^N \exp\left( -\frac{\|r - A\hat{x}\|^2}{2\sigma^2} \right)$$

To compute the above equation, the decoder may need a hypothesis of all possible combinations of the valid codewords. In some cases, if K is the number of information bits (CQI/PMI/RI), then the ML receiver needs to test $2^k$ codewords to identify the maximum likelihood codeword. In some embodiments, the radio network node may select the set of test codewords whose size is $2^{k1}$, where k1 is the number of information bits (CQI/PMI/RI) after the remapping as explained above.

Example: A method performed at the transmitting node to receive the control information from the receiver node, the method choosing a subset of codewords.

According to some embodiments, the size of the PMI field may not be reduced, i.e., the same number of PMI bits are transmitted in the feedback message. However, since the number of bits in the reduced set of PMI bit is known when codebook subset restriction is applied, the complexity of the decoding stage may be reduced. The feedback channel may include $2^N$ codewords but when codebook subset restriction is applied, $2*(N-m)$ codewords may be unknown, if N−m represents the number of available PMI bits after restriction. In other words, computing resources may be conserved in the decoding stage by taking advantage of the aforementioned technique.

In some embodiments, hypothesis testing may be applied to the uplink receiver at the base station in order to reduce the complexity of the receiver. More specifically, in cases where a subset restriction is applied, but the number of bits in the PMI field is not reduced, the uplink receiver may reduce the search space to reduce computational complexity. For example, if the feedback channel uses 4 bits for PMI and 4 bits for CQI, a total of 8 bits are used. To decode, the receiver may need to consider $2^8$ combinations. However, based on a subset restriction, the base station may have removed some PMI combinations and accordingly informed the UE to not use these PMI combinations. As such, the base station may remove these PMI combinations from the decoder search space such that the receiver would need to consider $<2^8$ combinations. In other words, combinations not used for the subset restrictions are removed from the search space, thereby reducing the complexity of the decoder. In these cases, the number of PMI bits used may not be reduced, but the receiver complexity is reduced based on the subset restriction.

In some embodiments, the method includes determining a codebook subset restriction indicating a reduced set of precoding matrices out of an original set of precoding matrices in an original codebook, wherein a full set of Precoding Matrix Indicator, PMI, bits is used to identify the original set of precoding matrices in the original codebook. The method includes determining, based on the codebook subset restriction, a reduced decoding space for a receiver, wherein a number of entries in the reduced decoding space is less than a number of entries in a full decoding space corresponding to the original codebook.

Embodiments for Machine Type Communication (MTC) Applications

In some embodiments, the codebook subset restriction may be applied to UEs that may support single layer transmission only. Examples of such UEs may include Category 0 UEs and UEs with coverage extension mode as being discussed in Rel.13 of LTE. Coverage extension may be achieved by repetition of the physical channel such as PUCCH, EPDCCH, PUSCH and PDSCH. Hence, these UEs may benefit from the embodiments discussed herein in that the CSI feedback information for rank>1 need not be transmitted by the UE in the CSI reporting, and hence the coverage may be extended. Hence, codebook subset restriction may be applied in this case. Either these UEs are configured by RRC signaling by a codebook subset restriction message to not report rank>1 or this codebook subset restriction may be read from standard specifications that the UE with the single layer reception limitation may implicitly assume a codebook subset restriction that excludes any precoder matrices in the codebook of rank>1. Note that even if such implicit codebook restriction is applied, within the set of rank 1 precoders, the PMI restriction part of the codebook subset restriction may still be explicitly signaled over RRC. According to some embodiments, the CSI payload may be reduced and the coverage of the uplink may thus be improved. As this is a UE category with a need for coverage extension, these embodiments are beneficial. This may also reduce the need for PUCCH or PUSCH repetitions which may be beneficial from an overhead and system resource utilization perspective.

Embodiment for 2D MIMO Precoding Codebooks

In LTE Rel-13 SI, a two dimensional (2D) precoding codebook is under discussion. The application may be a two dimensional antenna array with M rows of antenna elements and N columns. Typically the antenna elements may be dual polarized, with two ports having orthogonal polarization. Typical values may be M=8 rows and N=4 columns. In this case, the precoding matrix, or precoding vector information may be included in feedback for both for the vertical dimensions of the array and the horizontal dimension of the array for cases where the eNB is equipped with a 2D antenna array with antenna ports in both horizontal and vertical directions. Moreover, a third precoding matrix that controls the polarization co-phasing may be used. The combination of these two or three precoding matrices or vectors may constitute the resulting 2D precoding matrix. Assuming in the following, without loss of generality, the case without polarization precoding, and these two PMIs are denoted PMI_v and PMI_h respectively, embodiments described herein may be applied to this case as well. For example, each PMI may consist of 6 bits of feedback, for a total 12 bits to be transmitted to select the 2D precoding matrix or precoding vector. If these 12 bits are generated per subband, then there may be a large CSI feedback overhead from the UE to the eNB. For some UEs, adaptively changing the precoder in one dimension may have less importance and give lower gains. For example, this may be the case if the UE is stationary in elevation (i.e. on a floor in a building) for a long time.

Hence, one of the PMI, e.g. the vertical PMI_v, can be subset restricted whereas the horizontal PMI_h may not be subset restricted. For such UEs it may undesirable for them to feed back the full 12 bits of information to the network. Embodiments described herein may improve performance by restricting the feedback overhead to match, for example the PMI_h, the horizontal PMI. In one nonlimiting example, the PMI_v may be restricted to two matrices (one bit is thus needed) and PMI_h may be unrestricted (6 bits in this example).

Another variant of this embodiment is that no subset restriction (and thus no payload reduction) may be applied for PMI_h and PMI_v when UE is triggered by an aperiodic CSI report (transmitted using PUSCH) whereas the subset restriction may be applied when transmitting a periodic CSI report (transmitted using PUCCH). For example, in periodic reports, only PMI_h may be transmitted (or a coarse PMI_v using e.g. 1 bit), whereas in aperiodic reports the unrestricted PMI_v and PMI_h may be transmitted, relying on the assumption that PMI_v (i.e. movements in the elevation domain) is changing much slower than in horizontal domain, i.e. PMI_h. Hence, in this case the codebook subset restriction may be implicit, as it depends on the used feedback mode, aperiodic or periodic.

Operations and methods, as discussed above, will be further illustrated in FIGS. 6-15. FIGS. 6-15 are flowcharts of operations and methods by a network node configured according to some embodiments. Various embodiments illustrated in FIGS. 6-15 may arise from a recognition for a need to reduce the set of Precoding Matrix Indicator (PMI) bits used to identify the set of precoding matrices used in the subset restriction. FIG. 6 is a flowchart illustrating operations of systems/methods according to some embodiments. In particular, FIG. 6 illustrates a method of determining a codebook subset restriction indicating a reduced set of precoding matrices out of an original set of precoding matrices in an original codebook (block 601). This determination may be performed by the network. In some embodiments, a full set of Precoding Matrix Indicator (PMI) bits is used to identify the original set of precoding matrices in the original codebook. The codebook subset restriction may be, in some embodiments, optionally transmitted to a user equipment (block 602). In some embodiments, the codebook subset restriction may be transmitted to a wireless node. In some embodiments, a reduced set of Precoding Matrix Indicator (PMI) bits for use in a feedback channel may be determined based on a number of entries in the reduced set of precoding matrices. The reduced set of PMI bits may include fewer bits than the full set of PMI bits.

In some embodiments, the original codebook may be referred to as a master codebook. Several configuration codebooks that are a subset of the master codebook may be defined. For example, configuration 1, configuration 2, configuration 3, and configuration 4 codebooks, which are all subsets of the master codebook may be defined. Entries in each of the these configurations need not be unique. In other words, some entries may be, for example, in configuration 2 and configuration 3. Each of these configuration codebooks may need fewer PMI bits to signal the entries when compared to the number of PMI bits required for the master codebook. The original codebook may comprise a master codebook. The method by the network node may include selecting a configuration codebook that is a subset of the master codebook. The method may include determining a reduced set of PMI bits based on the number of entries in the configuration codebook for use in the feedback channel.

Figure 7:
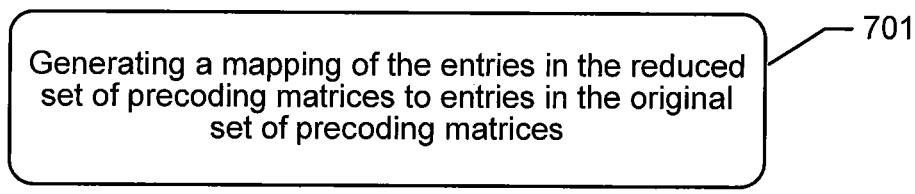
Figure 8:
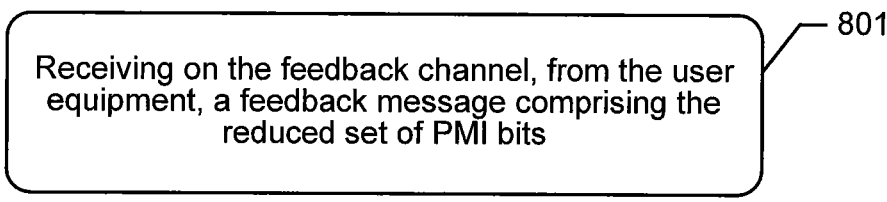

Referring to FIG. 7, a mapping of the entries in the reduced set of precoding matrices to entries in the original set of precoding matrices may be generated (block 701). The mapping of the entries in the reduced set of precoding matrices to entries in the original set of precoding matrices may be determined. Referring to FIG. 8, a feedback message including the reduced set of PMI bits may be received on the feedback channel, from the user equipment (block 801).

In some embodiments, referring to FIG. 9, the method may include determining, based on a value of the reduced set of PMI bits and the mapping, a precoding matrix from the original set of precoding matrices (block 901). Referring to FIG. 10, in some embodiments, the feedback message may be a first feedback message and the method may include transmitting an instruction to a second user equipment to refrain from applying codebook subset restriction (block 1001). The method may include receiving on the feedback channel, from the second user equipment, a second feedback message comprising the full set of PMI bits (block 1002). In some embodiments, the original set of precoding matrices may be represented by a set of original PMI bits and/or a number of bits in the reduced set of PMI bits is less than a number of bits in the set of original PMI bits. According to some embodiments, complexity of a decoder for the feedback channel is reduced based on a difference between the number of bits in the reduced set of PMI bits and the number of bits in the set of original PMI bits. The feedback channel may include an uplink control channel and/or a downlink control channel. In some embodiments, determining the codebook subset restriction may be based on receiving a channel state information (CSI) report from the user equipment.

Figures 11, 12:
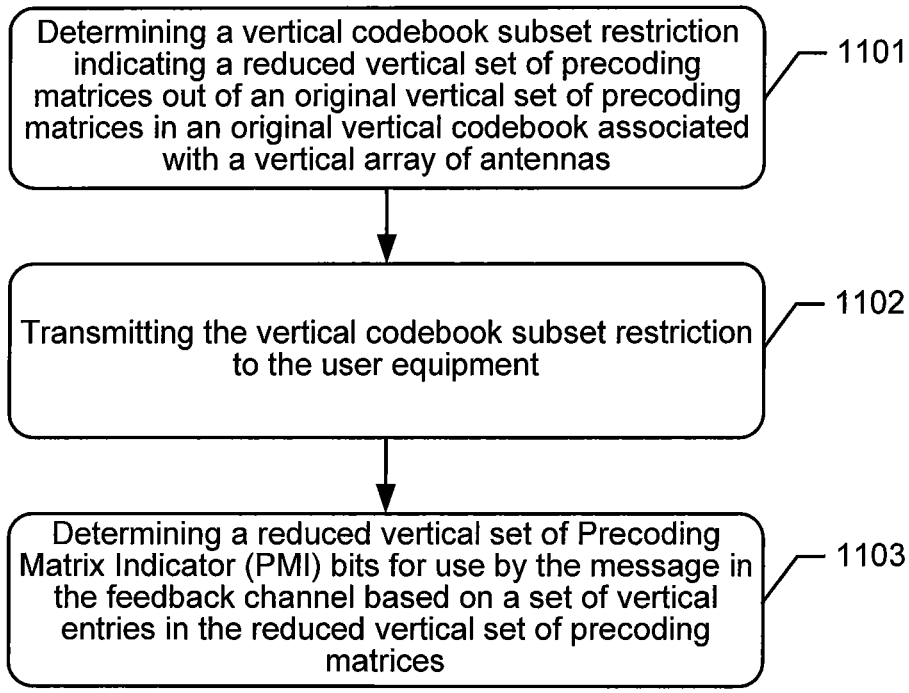

Referring to FIG. 11, the original set of precoding matrices may be associated with a horizontal dimension in a two dimensional array of antennas. The method may include determining a vertical codebook subset restriction indicating a reduced vertical set of precoding matrices out of an original vertical set of precoding matrices in an original vertical codebook associated with a vertical dimension in a two dimensional array of antennas (block 1101). The method may include transmitting the vertical codebook subset restriction to the user equipment (block 1102). The method may include determining a reduced vertical set of Precoding Matrix Indicator (PMI) bits for use by the message in the feedback channel based on a set of vertical entries in the reduced vertical set of precoding matrices (block 1103).

Referring to FIG. 12, the method may include generating a vertical mapping of the entries in the reduced vertical set of precoding matrices to entries in the original vertical set of precoding matrices (block 1201). Referring to FIG. 13, the method may include receiving on the feedback channel, from the user equipment, the message comprising the reduced vertical set of PMI bits (block 1301). Referring to FIG. 14, the method may include determining, based on a value of the reduced vertical set of PMI bits and the vertical mapping, a vertical precoding matrix from the original vertical set of precoding matrices (block 1401). The original set of precoding matrices may be equivalent to the original vertical set of precoding matrices.

Referring to FIG. 15, in some embodiments, determining the codebook subset restriction may be based on receiving a channel state information (CSI) report from the user equipment periodically or aperiodically. The method may include applying the codebook subset restriction and/or the vertical codebook subset restriction to the feedback channel responsive to receiving the CSI report periodically (block 1501). The method may include refraining from applying the codebook subset restriction and the vertical codebook subset restriction responsive to receiving the CSI report aperiodically (block 1502).

Figure 16:
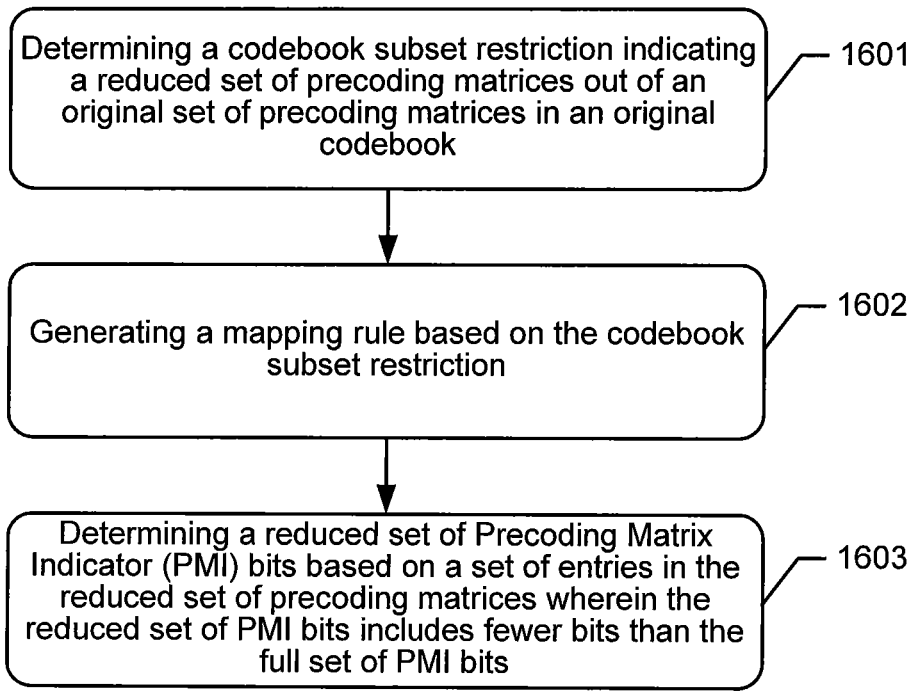
FIGS. 16 to 19 are flowcharts of operations and methods by a user equipment configured according to some embodiments.

FIGS. 16-19 are flowcharts of operations and methods by a user equipment (UE) configured according to some embodiments. FIG. 16 is a flowchart illustrating operations of systems/methods according to some embodiments. In particular, FIG. 16 illustrates a method of determining a codebook subset restriction indicating a reduced set of precoding matrices out of an original set of precoding matrices in an original codebook (block 1601). In some embodiments, a full set of Precoding Matrix Indicator (PMI) bits may be used to identify the original set of precoding matrices in the original codebook.

In some embodiments, the method may include generating a mapping rule based on the codebook subset restriction (block 1602). Determining the codebook subset restriction may include receiving the codebook subset restriction from a network node. The codebook subset restriction may include determining, by the user equipment, the codebook subset restriction indicating a reduced set of precoding matrices based on a reported user equipment category. Generating the codebook subset restriction may include determining, by the user equipment, the codebook subset restriction indicating a reduced set of precoding matrices based on a physical channel type used to transmit uplink control information.

In some embodiments, generating a mapping rule may be based on the codebook subset restriction (block 1602). According to some embodiments, reduced set of Precoding Matrix Indicator (PMI) bits may be determined based on a set of entries in the reduced set of precoding matrices (block 1603). In some embodiments, the reduced set of PMI bits may include fewer bits than the full set of PMI bits. In some embodiments, determining the codebook subset restriction may include receiving the codebook subset restriction from a network node. In some embodiments, generating the codebook subset restriction may include receiving the codebook subset restriction from a network node. Generating the codebook subset restriction may include determining, by the UE, the codebook subset restriction indicating a reduced set of precoding matrices based on a reported UE category. Generating the codebook subset restriction may include determining, by the UE, the codebook subset restriction indicating a reduced set of precoding matrices based on a physical channel type used to transmit uplink control information.

Figure 17:
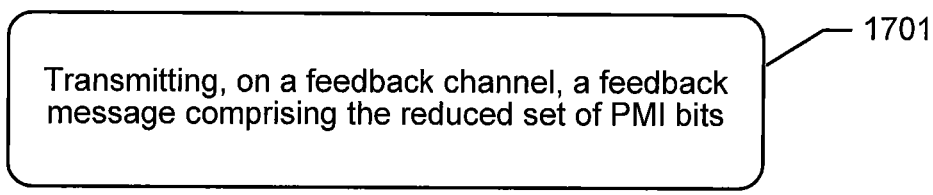

Referring to FIG. 17, the method may include transmitting, on a feedback channel, a feedback message including the reduced set of PMI bits (block 1701). In some embodiments, the method may include transmitting, on a feedback channel, a feedback message including the reduced vertical set of PMI bits (block 1701). In some embodiments, the reduced set of PMI bits may include an indication of one of the reduced set of precoding matrices based on the mapping rule.

Figure 18:
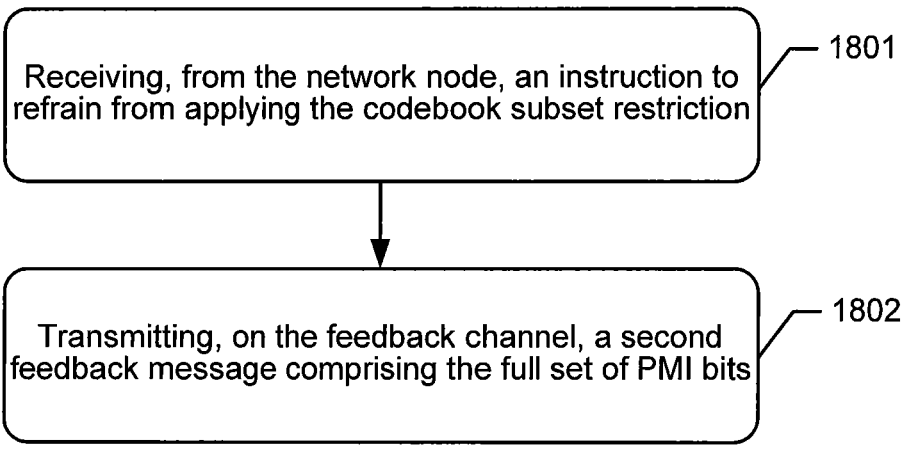

In some embodiments, the feedback message may be a first feedback message. Referring to FIG. 18, the method may include receiving, from the network node, an instruction to refrain from applying the codebook subset restriction (block 1801). In some embodiments, the method may include transmitting, on the feedback channel, a second feedback message comprising the full set of PMI bits (block 1802).

Figure 19:
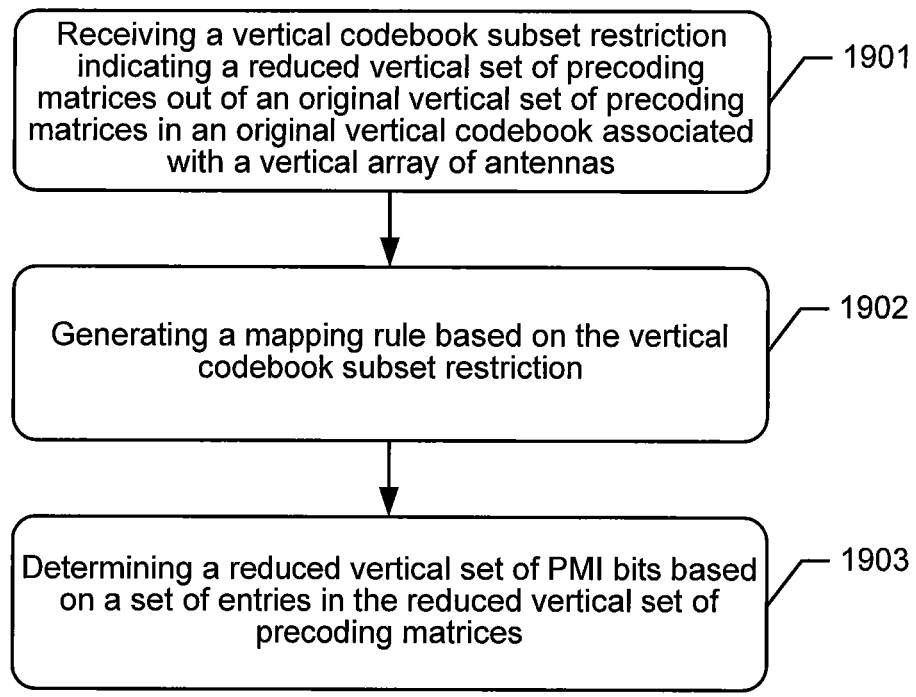

In some embodiments, the original set of precoding matrices may be associated with a horizontal array of antennas. Referring to FIG. 19, the method may include receiving a vertical codebook subset restriction indicating a reduced vertical set of precoding matrices out of an original vertical set of precoding matrices in an original vertical codebook associated with a vertical array of antennas (block 1901). The method may include generating a mapping rule based on the vertical codebook subset restriction (block 1902). The mapping rule may include a vertical mapping rule. In some embodiments, the method may include determining a reduced vertical set of PMI bits based on a set of entries in the reduced vertical set of precoding matrices (block 1903). In some embodiments, the user equipment is configured to decode spatial layers based on a rank of 1.

Example User Equipment and Network Node

Figure 20:
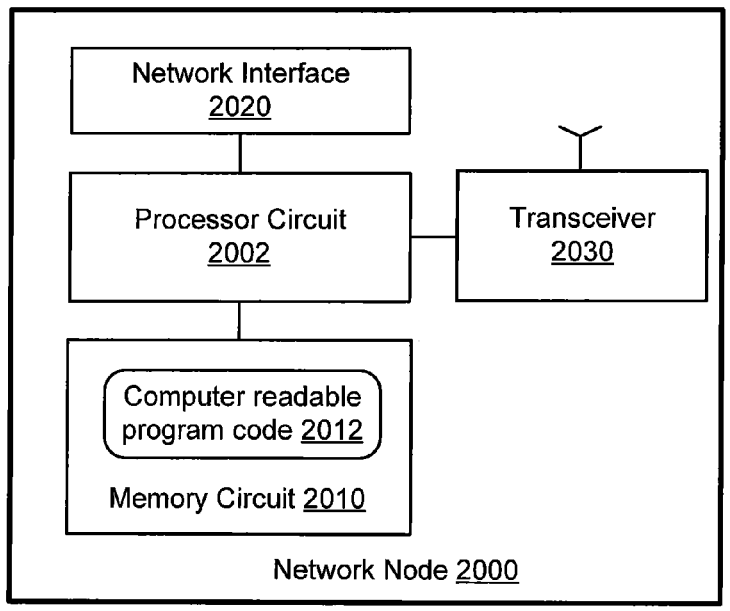
FIG. 20 is a block diagram of a network node configured according to some embodiments.

FIG. 20 is a block diagram of a network node 2000, for use in a telecommunications system, that is configured according to one or more embodiments disclosed herein for an eNB, radio network node, or other network node. The network node 2000 can include a transceiver 2030, a network interface 2020, a processor circuit 2002, and a memory circuit 2010 containing computer readable program code 2012.

The transceiver 2030 is configured to communicate with the UE 2100 using one or more of the radio access technologies disclosed herein, when the network node 2000 is a radio network node. The processor circuit 2002 may include one or more data processing circuits, such as a general purpose and/or special purpose processor, e.g., microprocessor and/or digital signal processor, that may be collocated or distributed across one or more networks. The processor circuit 2002 (also referred to as a processor) is configured to execute the computer readable program code 2012 in the memory 2010 to perform at least some of the operations and methods of described herein as being performed by a network node. For example, processor 2002 may be configured to perform operations discussed above with respect to FIGS. 1-19. The network interface 2020 communicates with other network nodes and/or a core network.

Figure 21:
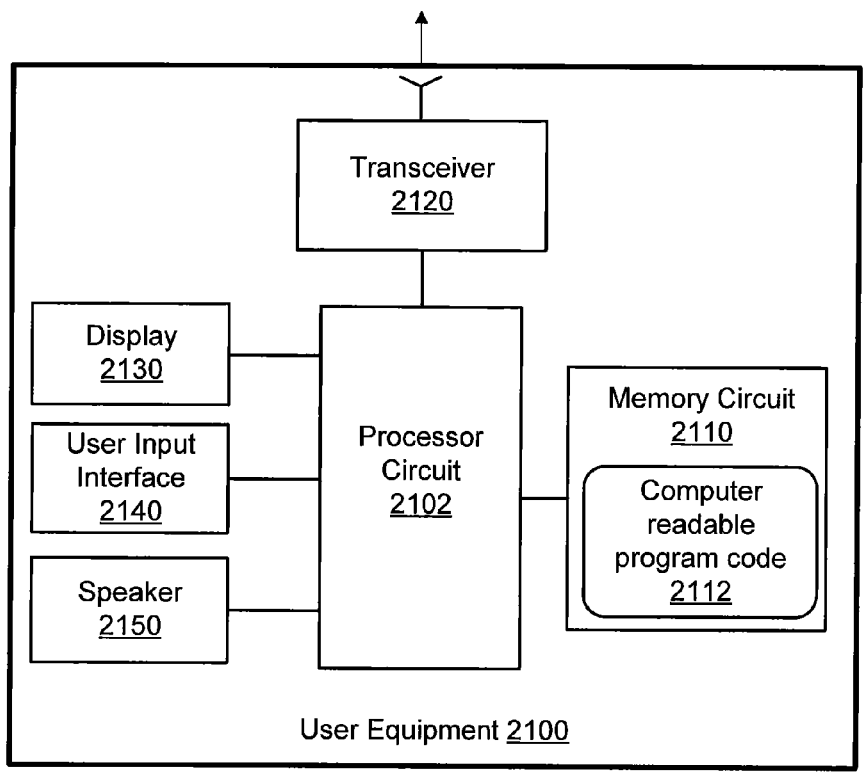
FIG. 21 is a block diagrams of a UE configured according to some embodiments.

FIG. 21 is a block diagram of a UE 2100, for use in a telecommunications system, that is configured to perform operations according to one or more embodiments disclosed herein. The UE 2100 includes a transceiver 2120, a processor circuit 2102, and a memory circuit 2110 containing computer readable program code 2112. The UE 2100 may further include a display 2130, a user input interface 2140, and a speaker 2150.

The transceiver 2120 is configured to communicate with a network node, the example of which is an eNB, through a wireless air interface using one or more of the radio access technologies disclosed herein. The processor circuit 2102 (also referred to as a processor) may include one or more data processing circuits, such as a general purpose and/or special purpose processor, e.g., microprocessor and/or digital signal processor. The processor circuit 2102 is configured to execute the computer readable program code 2112 in the memory circuit 2110 to perform at least some of the operations described herein as being performed by a UE. For example, processor 2102 may be configured to perform operations discussed above with respect to FIGS. 1-19.

Figure 22:
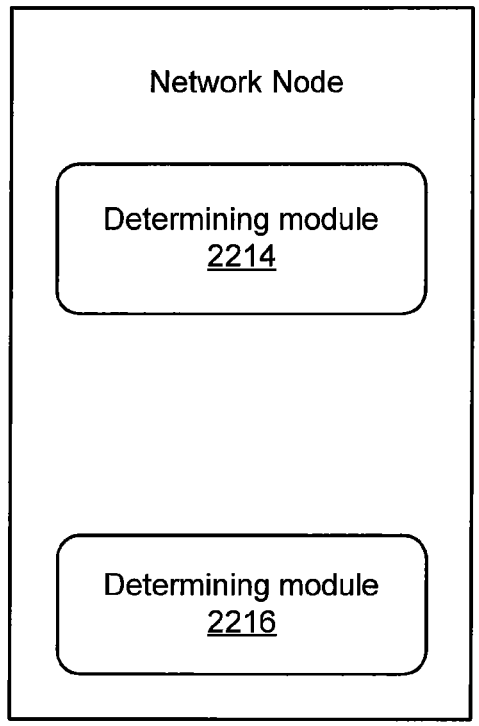
FIG. 22 illustrates modules residing in a network node according to some embodiments.

FIG. 22 illustrates modules residing in a network node, such as the network node 2000 of FIG. 20, that perform operations as disclosed herein according to some embodiments. In particular, the network node includes a determining module 2214 for determining a codebook subset restriction indicating a reduced set of precoding matrices out of an original set of precoding matrices in an original codebook, and a determining module 2216 for determining a reduced set of PMI bits.

Figure 23:
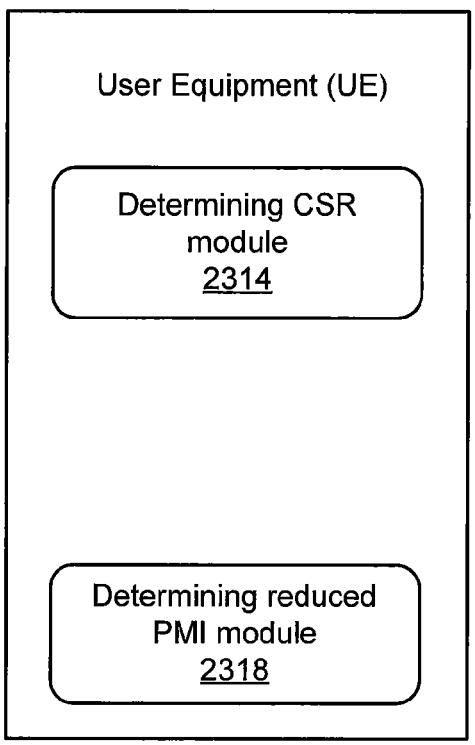
FIG. 23 illustrates modules residing in a UE according to some embodiments.

FIG. 23 illustrates modules residing in a UE, such as the UE 2100 of FIG. 21, that perform operations as disclosed herein according to some embodiments. The UE includes a determining CSR module 2314 for determining a codebook subset restriction indicating a reduced set of precoding matrices out of an original set of precoding matrices in an original codebook, and a determining reduce PMI module 2318 for determining a reduced set of PMI.

ABBREVIATIONS

HSPA high-speed packet access
LTE long term evolution
CQI channel quality indicator
UE user equipment
RNC radio network controller
TTI transmission time interval
HS-PDSCH High-Speed Physical Downlink Shared Channel
HS-SCCH High-Speed Shared Control Channel
HS-DPCCH High-Speed Dedicated Control Channel
HARQ Hybrid automatic retransmission request
ACK Acknowledgement
NACK Negative acknowledgement Further Definitions and Embodiments In the above-description of various embodiments, it is to be understood that the terminology used herein is for the purpose of describing particular embodiments only and is not intended to be limiting. Unless otherwise defined, all terms (including technical and scientific terms) used herein have the same meaning as commonly understood by one of ordinary skill in the art to which present embodiments belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present embodiments. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of embodiments. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present embodiments. All such variations and modifications are intended to be included herein within the scope of present embodiments. Accordingly, the above disclosed subject matter is to be considered illustrative, and not restrictive, and the appended examples of embodiments are intended to cover all such modifications, enhancements, and other embodiments, which fall within the spirit and scope of present embodiments. Thus, to the maximum extent allowed by law, the scope of present embodiments are to be determined by the broadest permissible interpretation of the present disclosure including the following examples of embodiments and their equivalents, and shall not be restricted or limited by the foregoing detailed description.

What is claimed is:

1. A method by a network node in a communications system, the method comprising:
   determining a codebook subset restriction indicating a reduced set of precoding matrices out of an original set of precoding matrices in an original codebook, wherein a full set of Precoding Matrix Indicator, PMI, bits is used to identify the original set of precoding matrices in the original codebook;
   determining a reduced set of PMI bits for use in a feedback channel based on a number of entries in the reduced set of precoding matrices, wherein the reduced set of PMI bits has fewer bits than the full set of PMI bits;
   determining a mapping of the entries in the reduced set of precoding matrices to entries in the original set of precoding matrices; and
   decoding signals from the feedback channel using the reduced set of PMI bits.

2. The method of claim 1, further comprising:
   transmitting the codebook subset restriction indicating the reduced set of precoding matrices to a user equipment.

3. The method of claim 1, further comprising:
   receiving on the feedback channel at the network node, from the user equipment, a feedback message having a length defined by the reduced set of PMI bits.

4. The method of claim 3, further comprising:
   determining, based on a value of the reduced set of PMI bits and the mapping, a precoding matrix from the original set of precoding matrices.

5. The method of claim 3, further comprising:
   transmitting an instruction to another user equipment to refrain from applying codebook subset restriction; and
   receiving on the feedback channel, from the another user equipment, another feedback message comprising the full set of PMI bits, responsive to the instruction.

6. The method of claim 1,
   wherein the original set of precoding matrices is represented by the full set of PMI bits, and
   wherein a number of bits in the reduced set of PMI bits is less than a number of bits in the full set of PMI bits.

7. The method of claim 1, wherein the feedback channel comprises an uplink control channel and/or a downlink control channel.

8. The method of claim 1, wherein the codebook subset restriction is determined based on receiving a channel state information, CSI, report received from the user equipment.

9. The method of claim 1, wherein the original set of precoding matrices is associated with a horizontal array of antennas, the method further comprising:
   determining a vertical codebook subset restriction indicating a reduced vertical set of precoding matrices out of an original vertical set of precoding matrices in an original vertical codebook associated with a vertical array of antennas; and
   determining a reduced vertical set of Precoding Matrix Indicator, PMI, bits for use in the feedback channel based on a set of vertical entries in the reduced vertical set of precoding matrices.

10. The method of claim 9, further comprising:
    transmitting the vertical codebook subset restriction to the user equipment.

11. The method of claim 9, further comprising:
    generating a vertical mapping of the entries in the reduced vertical set of precoding matrices to entries in the original vertical set of precoding matrices.

12. The method of claim 9, further comprising:
    receiving on the feedback channel, from the user equipment, a message comprising the reduced vertical set of PMI bits.

13. The method of claim 11, further comprising:
    determining, based on a value of the reduced vertical set of PMI bits and the vertical mapping, a vertical precoding matrix from the original vertical set of precoding matrices.

14. The method of claim 9, wherein the original set of precoding matrices is the same as the original vertical set of precoding matrices.

15. The method of claim 9, wherein the determining the codebook subset restriction is based on receiving a channel state information, CSI, report from the user equipment, the method further comprising:
    applying the codebook subset restriction and/or the vertical codebook subset restriction to decode the feedback channel responsive to receiving the CSI report periodically; and refraining from applying the codebook subset restriction and the vertical codebook subset restriction responsive to receiving the CSI report aperiodically.

16. The method of claim 1, wherein each precoding matrix of the original set of precoding matrices in the original codebook is identified by a respective pattern of the full set of PMI bits, and
wherein each precoding matrix in the reduced set of precoding matrices is identified by a respective pattern of the reduced set of PMI bits.

17. A network node in a telecommunication system wherein the network node is adapted to perform according to claim 1.

18. A method by a user equipment in a communications system, the method comprising:
determining a codebook subset restriction indicating a reduced set of precoding matrices out of an original set of precoding matrices in an original codebook, wherein a full set of Precoding Matrix Indicator, PMI, bits is used to identify the original set of precoding matrices in the original codebook; and
generating a mapping rule based on the codebook subset restriction; and
determining a reduced set of PMI bits based on a set of entries in the reduced set of precoding matrices wherein the reduced set of PMI bits has fewer bits than the full set of PMI bits.

19. The method of claim 18, wherein the determining the codebook subset restriction comprises receiving the codebook subset restriction from a network node.

20. The method of claim 18, wherein the generating the codebook subset restriction comprises determining, by the user equipment, the codebook subset restriction indicating a reduced set of precoding matrices based on a reported user equipment category.

21. The method of claim 18, wherein the generating the codebook subset restriction comprises determining, by the user equipment, the codebook subset restriction indicating a reduced set of precoding matrices based on a physical channel type used to transmit uplink control information.

22. The method of claim 18, further comprising:
transmitting, on a feedback channel, a feedback message having the reduced set of PMI bits,
wherein the reduced set of PMI bits comprise an indication of one of the reduced set of precoding matrices based on the mapping rule.

23. The method of claim 22, further comprising:
receiving, from the network node, an instruction to refrain from applying the codebook subset restriction; and
transmitting, on the feedback channel, another feedback message comprising the full set of PMI bits, responsive to the instruction.

24. The method of claim 18, wherein the original set of precoding matrices is associated with a horizontal array of antennas, the method further comprising:
receiving a vertical codebook subset restriction indicating a reduced vertical set of precoding matrices out of an original vertical set of precoding matrices in an original vertical codebook associated with a vertical array of antennas;
generating a vertical mapping rule based on the vertical codebook subset restriction; and
determining a reduced vertical set of PMI bits based on a set of entries in the reduced vertical set of precoding matrices.

25. The method of claim 24, the further comprising:
transmitting on the feedback channel, the feedback message comprising the reduced vertical set of PMI bits,
wherein the reduced vertical set of PMI bits comprise an indication of one of the reduced vertical set of precoding matrices based on the vertical mapping rule.

26. The method of claim 24, the method further comprising:
receiving a request from the network node to send a channel state information, CSI, report periodically or aperiodically;
applying the codebook subset restriction and/or the vertical codebook subset restriction to the feedback message on the feedback channel, responsive to determining that the CSI report be sent periodically; and
refraining from applying the codebook subset restriction and the vertical codebook subset restriction to the feedback message on the feedback channel, responsive to determining that the CSI report be sent aperiodically.

27. The method of claim 22, wherein the feedback channel comprises an uplink control channel and/or a downlink control channel.

28. The method of claim 18, wherein the user equipment is configured to decode spatial layers based on a rank of 1.

29. The method of claim 18,
wherein each precoding matrix of the original set of precoding matrices in the original codebook is identified by a respective pattern of the full set of PMI bits, and
wherein each precoding matrix in the reduced set of precoding matrices is identified by a respective pattern of the reduced set of PMI bits.

30. A user equipment in a telecommunication system wherein the user equipment is adapted to perform according to claim 18.

31. A network node comprising:
a transceiver configured to provide communication between the network node and a user equipment; and
a processor coupled with the transceiver, wherein the processor is configured to perform operations comprising:
determining a codebook subset restriction indicating a reduced set of precoding matrices out of an original set of precoding matrices in an original codebook, wherein a full set of Precoding Matrix Indicator, PMI, bits is used to identify the original set of precoding matrices in the original codebook;
determining a reduced set of PMI bits for use in a feedback channel based on a number of entries in the reduced set of precoding matrices, wherein the reduced set of PMI bits has fewer bits than the full set of PMI bits;
determining a mapping of the entries in the reduced set of precoding matrices to entries in the original set of precoding matrices; and
receiving on the feedback channel, from the user equipment, a feedback message having the reduced set of PMI bits.

32. The network node of claim 31, wherein the original set of precoding matrices is associated with a horizontal array of antennas, the operations further comprising:
determining a vertical codebook subset restriction indicating a reduced vertical set of precoding matrices out of an original vertical set of precoding matrices in an original vertical codebook associated with a vertical array of antennas; and determining a reduced vertical set of Precoding Matrix Indicator, PMI, bits for use in the feedback channel based on a set of vertical entries in the reduced vertical set of precoding matrices.

33. The network node of claim 32, the operations further comprising:
generating a vertical mapping of the entries in the reduced vertical set of precoding matrices to entries in the original vertical set of precoding matrices.

34. The network node of claim 33, the operations further comprising:
determining, based on a value of the reduced vertical set of PMI bits and the vertical mapping, a vertical precoding matrix from the original vertical set of precoding matrices.

35. The network node of claim 32, wherein the determining the codebook subset restriction is based on receiving a channel state information, CSI, report from the user equipment, the operations further comprising:
applying the codebook subset restriction and/or the vertical codebook subset restriction to the feedback channel responsive to receiving the CSI report periodically; and
refraining from applying the codebook subset restriction and the vertical codebook subset restriction responsive to receiving the CSI report aperiodically.

36. A user equipment comprising:
a transceiver configured to provide communication between user equipment and a network node; and
a processor coupled with the transceiver, wherein the processor is configured to perform operations comprising:
determining a codebook subset restriction indicating a reduced set of precoding matrices out of an original set of precoding matrices in an original codebook, wherein a full set of Precoding Matrix Indicator, PMI, bits is used to identify the original set of precoding matrices in the original codebook;
generating a mapping rule based on the codebook subset restriction; and
determining a reduced set of PMI bits based on a set of entries in the reduced set of precoding matrices wherein the reduced set of PMI bits has fewer bits than the full set of PMI bits.

37. The user equipment of claim 36, the operations further comprising:
transmitting, on a feedback channel, a feedback message comprising the reduced set of PMI bits,
wherein the reduced set of PMI bits comprise an indication of one of the reduced set of precoding matrices based on the mapping rule.

38. The user equipment of claim 36, the operations further comprising:
receiving, from the network node, an instruction to refrain from applying the codebook subset restriction; and
transmitting, on the feedback channel, another feedback message having the full set of PMI bits, responsive to the instruction.

39. The user equipment of claim 36, wherein the original set of precoding matrices is associated with a horizontal array of antennas, the operations further comprising:
receiving a vertical codebook subset restriction indicating a reduced vertical set of precoding matrices out of an original vertical set of precoding matrices in an original vertical codebook associated with a vertical array of antennas;
generating a vertical mapping rule based on the vertical codebook subset restriction; and
determining a reduced vertical set of PMI bits based on a set of entries in the reduced vertical set of precoding matrices.

40. The user equipment of claim 39, the operations further comprising:
receiving a request from the network node to send a channel state information, CSI, report periodically or aperiodically;
applying the codebook subset restriction and/or the vertical codebook subset restriction to a message on the feedback channel, responsive to determining that the CSI report be sent periodically; and
refraining from applying the codebook subset restriction and the vertical codebook subset restriction to the message on the feedback channel, responsive to determining that the CSI report be sent aperiodically.

* * * * *